United States Patent Office 3,637,804
Patented Jan. 25, 1972

3,637,804
PHENYLALANINE DERIVATIVES AND
PREPARATION THEREOF
Balthasar Hegedus, Binningen, and Paul Zeller, Allschwil, Switzerland, assignors to Hoffmann-La Roche Inc., Nutley, N.J.
No Drawing. Continuation-in-part of application Ser. No. 684,623, Nov. 21, 1967. This application Feb. 12, 1968, Ser. No. 704,506
Claims priority, application Switzerland, Dec. 1, 1966, 17,197/66
Int. Cl. C07c *101/08*
U.S. Cl. 260—471 A          6 Claims

ABSTRACT OF THE DISCLOSURE

Compounds of the formula

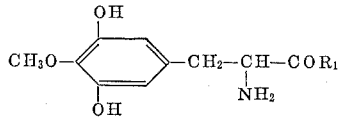

in which $R_1$ is hydroxy, alkoxy, or a substituted or unsubstituted amino group, optical isomers (preferably the L-antipodes) thereof and pharmaceutically acceptable salts thereof, useful as hypotensive agents, along with methods for their preparation from the appropriate phenylalanine precursor, are disclosed.

RELATED APPLICATION

This application is a continuation-in-part of Ser. No. 684,623, filed in the United States on Nov. 21, 1967, inventors Balthasar Hededus and Paul Zeller, now abandoned.

SUMMARY OF THE INVENTION

This invention relates to a novel class of compounds displaying pharmaceutical utility and process for their preparation. More particularly, this invention relates to novel racemic and optically active phenylalanine derivatives of the formula

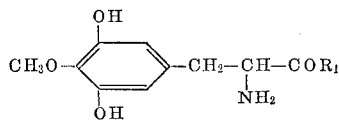

in which $R_1$ is hydroxyl, lower alkoxy, amino, lower alkyl substituted amino, optically active isomers (preferably the L-antipodes) thereof and pharmaceutically acceptable salts thereof, as well as processes for their preparation.

As used in Formula I and throughout the specification, lower alkoxy includes straight chain or branched chain alkoxy groups containing up to 6 carbon atoms, e.g., methoxy, ethoxy, n-propoxy, isopropoxy and the like. Lower alkyl includes straight chain or branched chain alkyl groups containing up to 6 carbon atoms, e.g., methyl, ethyl, isopropyl and the like.

The amino group can be substituted with one or two lower alkyl groups and the lower alkyl groups can be substituted with a hydroxyl group. Furthermore, the lower alkyl groups can be joined together to form a heterocyclic ring with the nitrogen atoms and if desired another hetero atom, e.g., piperidino or morpholino.

DETAILED DESCRIPTION OF THE INVENTION

Compounds represented by Formula I possess valuable pharmaceutical properties, for example, each of the compounds is useful as a hypotensive agent.

When administered, for example, orally to hypertonic rats, they produce a hypotensive effect in single doses. By way of illustration the compound of Example 1 which has an $LD_{50}$ of >5,000 mg./kg. (p.o.) in rats and mice and can be administered to rats for 6 weeks in dosages of 2,000 mg./kg./day without showing any undesirable side effects such as sedative effects, exhibits hypotensive activity in the blood pressure test when administered at single oral doses of 50 mg./kg. to 200 mg./kg.

The compounds of this invention have hypotensive effects similar in many respects to those of α-methyldopa, which is well known for its therapeutic uses and properties. However, whereas α-methyldopa in addition to showing hypotensive activity on peripheral organs also exerts a corresponding sedative side-effect on the CNS (as evidenced, e.g., on the decrease of the catechol amine level in the brains of rats) the compounds of the present invention show a significantly lower sedative side-effect, as evidenced from measurements of the catechol amine level in the brains of rats given p.o. single doses of 50 mg./kg. to 200 mg./kg.

Thus the compounds of the present invention demonstrate a pattern of activity associated with potent hypotensives of known clinical efficacy while in addition showing a minimum of disturbing side effects. The compounds of the invention are therefore useful as hypotensive agents in the treatment of such pathological conditions as essential hypertonia.

The novel compounds of Formula I are white crystalline solids which have basic and acidic properties and can be conveniently prepared as such as in the form of their acid and base addition salts. Said salts are characteristically crystalline solids soluble in water, somewhat less soluble in polar solvents such as methanol, ethanol and the like and relatively insoluble in non-polar solvents such as benzene, ether and petroleum ether and the like. The free amino acid is also soluble in methanol.

The compounds of this invention can be used in the form of conventional pharmaceutical preparations, for example, they or their salts can be used in admixture with a pharmaceutical organic or inorganic inert carrier which is suitable for enteral, percutaneous or parenteral application, e.g., water, gelatin, gum arabic, lactose, starch, magnesium stearate, talcum, vegetable oils, polyalkylene glycols, Vaseline and the like. The pharmaceutical preparations can be administered in solid form, e.g., as tablets, dragees, suppositories or capsules, in semi-solid form, e.g., as salves or in liquid form, e.g., as solutions, suspensions or emulsions. The preparations may be sterilized and/or contain additives such as preserving, stabilizing, wetting or emulsifying agents, salts for varying the osmotic pressure or buffers. They can also contain other therapeutically valuable substances.

The compounds of Formula I, in the form of the free acid, have amphoteric character and are readily soluble in water, acids and alkalis. The compounds can form salts with acids and alkalis, e.g., salts can be formed by the carboxyl groups with bases and by the amino group with acids. The compounds of Formula I also form esters with lower aliphatic alcohols, preferably methanol or ethanol. The compounds can also be converted into amides.

The compounds of Formula I which are particularly advantageous as hypotensive agents are those of the formula

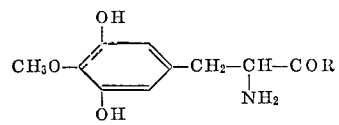

wherein $R_2$ represents hydroxyl, ethoxy, amino or dimethylamino, optical isomers (preferably the L-antipodes) thereof and pharmaceutically acceptable salts thereof.

Representative compounds within the scope of this preferred embodiment of the invention are:

DL-3,5-dihydroxy-4-methoxy-phenylalanine or its L-optical antipode;
DL-3,5-dihydroxy-4-methoxy-phenylalanine ethyl ester or its L-optical antipode;
DL-3,5-dihydroxy-4-methoxy-phenylalanine amide or its L-optical antipode;
DL - 3,5 - dihydroxy-4-methoxy-phenylalanine dimethylamide or its L-optical antipode.

The compounds of Formula I are obtained as racemates which can be resolved by conventional means. For example, esters may be resolved with optically active acids, e.g., tartaric acid, or salts may be formed with optically active bases, e.g., quinine or brucine. The D- and L-forms can then be separated, usually by solubility differences.

The compounds represented by Formula I are prepared by alternative synthesis routes utilizing a variety of intermediates.

Thus, it is necessary to first prepare compounds represented by the formula

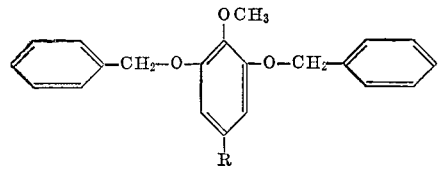

wherein R is an alanyl group or a group convertible to an alanyl group, e.g.,

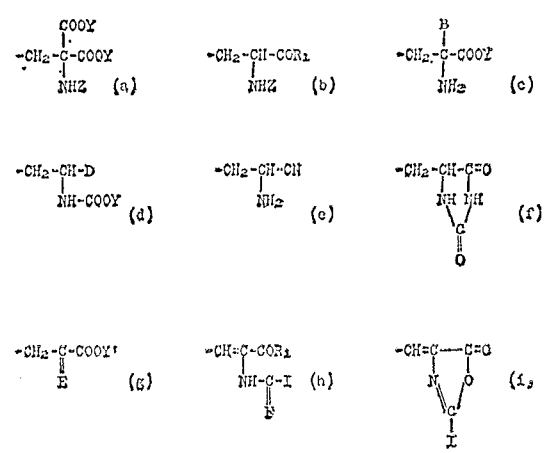

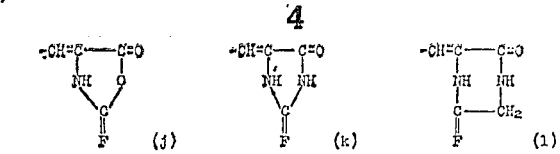

wherein $R_1$ in these groups has the same meaning as in Formula I, Y is alkyl, Y' is hydrogen or alkyl, Z is hydrogen or acyl, B is alkanoyl, D is carbalkoxy or cyanogen, E is hydroximino or phenylhydrozono, F is oxygen or sulfur and I is alkyl, phenyl, phenylalkyl or alkylphenyl.

As used herein, the alkyl groups represented by Y and Y' are either straight chained or branched chains and contain up to 6 carbon atoms, e.g., methyl, ethyl, isopropyl, n-hexyl and the like; the acyl groups represented by Z are alkanoyl, benzoyl, phenylalkanoyl or, if desired, carbalkoxy and carbophenylalkoxy. The alkanoyl moieties contain up to 6 carbon atoms, e.g., formyl, propionyl, isobutyryl, caproyl, and preferably acetyl, and the like. The phenyl moiety can contain the following substituents, halogen, alkyl with up to 6 carbon atoms or alkoxy with up to 6 carbon atoms; the aliphatic portion of the carbalkoxy and carbophenylalkoxy groups contains up to 6 carbon atoms, e.g., carbomethoxy, carbopropoxy, carbophenethoxy or carbobenzoxy, and the like. The alkanoyl groups represented by B, carbalkoxy groups represented by D and alkyl groups represented by I all contain up to 6 carbon atoms.

The compounds represented by Formula II are subsequently hydrogenated to form the compounds of Formula I which can be converted into salts by reaction with acids or bases and can be separated into its optical isomers. The carboxylic acids of Formula I can also be converted into the amides and esters within the scope of Formula I.

According to one embodiment of the process of the present invention, a compound of the Formula II in which R is an alanyl group, a lower alkyl ester or an amide thereof or a group convertible by reduction into any of the said groups, is reduced. Exemplary of the group R which can be present in compounds of the Formula II in such a process are the group (b) above, wherein Z is hydrogen or carbobenzoxy, and the group (g) above.

Another embodiment of the process of the present invention comprises reducing and hydrolyzing a compound represented by the Formula II in which R is a group convertible by hydrolysis or by reduction and hydrolysis into an alanyl group. Exemplary of such groups R are the group (b) above, wherein Z is acyl, and the groups (c), (e), (f), (h), (i), (j), (k) and (l) above.

Yet another embodiment of the process of the invention comprises reducing, hydrolyzing and decarboxylating a compound of the Formula II in which R is a group convertible by hydrolysis and decarboxylation into an alanyl group. Exemplary of such R groups are the groups (a) and (d) above.

The various intermediate compounds represented by Formula II are prepared by the synthesis routes discussed hereinafter.

Compounds of the general formula

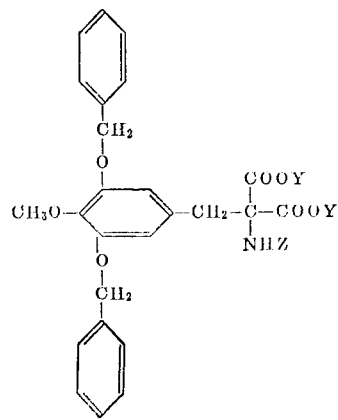

wherein Y is an alkyl group and Z is hydrogen or an acyl group, and

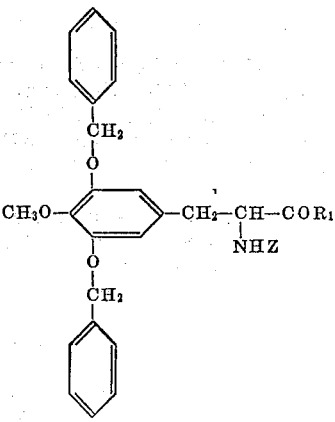

wherein $R_1$ is hydroxy, alkoxy or a substituted amino group and Z is hydrogen or an acyl group can be prepared by methylating the p-hydroxyl group of an ester of 3,4,5-trihydroxybenzoic acid with a methylating agent, for example, with dimethyl sulfate, converting the free hydroxyl groups into benzyloxy groups by treating with benzyl chloride in the presence of a base, for example, in the presence of an aqueous sodium hydroxide solution in a temperature range between room temperature and the boiling point of the reaction mixture and reducing the resulting ester of 3,5-dibenzyloxy-4-methoxy-benzoic acid in a suitable solvent, preferably in ether, at boiling with lithium aluminium hydride. The resulting alcohol is then converted into a compound of the formula

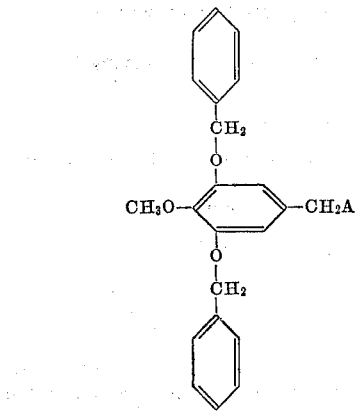

wherein A is halogen or an alkyl or aryl sulfonyloxy group, by means of a halogenating agent, for example, phosphorus trichloride or thionyl chloride in an inert solvent, e.g., ether, benzene or methylene chloride, or by means of a sulfurylating agent, e.g., methane sulfochloride or toluene sulfochloride in the presence of a base such as pyridine or triethylamine in a temperature range between room temperature and the boiling point of the reaction mixture.

In order to prepare the compounds of Formula IIa in which Z is acyl, the compound of Formula IIIa is condensed with a compound of the general formula

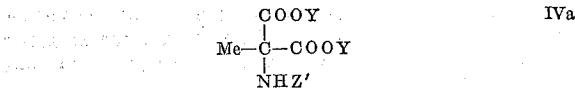

in which Me is an alkali metal, Y is an alkyl and Z' is an acyl group.

The sodium salt of a diethyl ester of acylaminomalonic acid is preferred among the compounds of Formula IVa that are suitable for the condensation with compounds of IIIa.

The condensation is advantageously carried out in an organic solvent, e.g., ethanol, benzene, dimethylformamide or dimethyl sulfoxide. The reaction is exothermic and is terminated by heating. If dimethylformamide or an alkanol is used as the solvent, the reaction product can be precipitated by the addition of water. If benzene is used, the reaction product can be separated from by-products by washing with water, isolated by evaporating, and purified, if necessary, by recrystallization. Thus, compounds represented by Formula IIa in which Z is an acyl group are obtained.

If compounds of Formula IIa in which the Z is hydrogen are desired, a halide or sulfonate of the Formula IIIa can be reacted with an alkali salt of a malonic ester in an inert solvent, for example, in an alkanol, in benzene or dimethylformamide at elevated temperature. The resulting compound of the formula

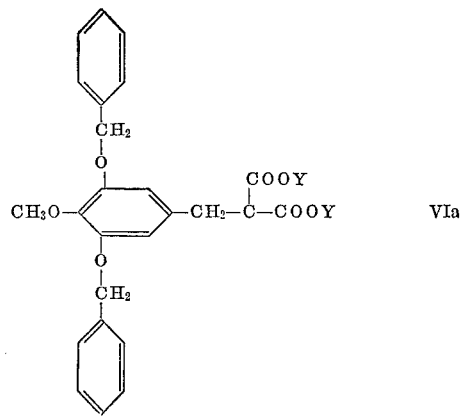

wherein Y is an alkyl group, can subsequently be reacted with bromine or chlorine in an inert solvent, e.g., in benzene or methylene chloride at elevated temperature. Reaction of the resulting compound of the formula

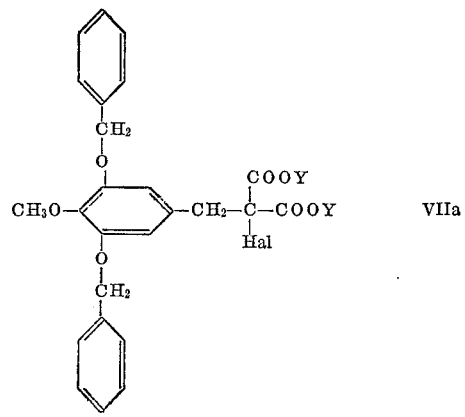

wherein Y is an alkyl group, and Hal is bromine or chlorine, with ammonia converts it into the desired compound of Formula IIa, in which Z is hydrogen.

The products of Formula IIa can also be converted into compounds of Formula IIb; for example, by hydrolyzing a compound of Formula IIa to the corresponding acid with alkali, e.g., with aqueous sodium hydroxide solution in a concentration of approximately 10% by weight, in a temperature range between room temperature and approximately 100° C. In this manner the two ester groups are hydrolytically cleaned and one of the two carboxyl groups is decarboxylated by neutralization or acidification of the reaction mixture, with the result that an acid of Formula IIb is formed. Any acyl groups represented by Z which are present can be removed acid hydrolysis, forming an acid salt. For example, the hydrochloride of the corresponding amino acid is obtained if hydrochloric acid is used.

The acids of Formula IIb, obtained as described above, can be esterified with lower alkanols and can then be amidated with ammonia or with a mono- or disubstituted amine.

Compounds of the general formula

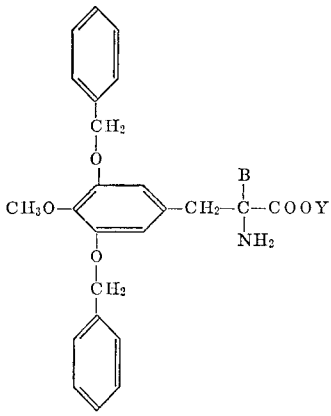 IIc wherein Y is an alkyl and B is an alkanoyl group, can be prepared by condensing a 3,5-dibenzyloxy-4-methoxybenzyl halide or a corresponding sulfonyloxy derivative with an alkali salt of an alkanoyl acetic ester and by reacting the resulting substituted alkanoyl acetic ester with bromine or chlorine in an inert solvent, e.g., in benzene or methylene chloride at a temperature between room temperature and the boiling temperature of the reaction mixture. The hydrohalic acid is removed by shaking with water. The resulting ester of an α-halogen-β-keto acid of formula

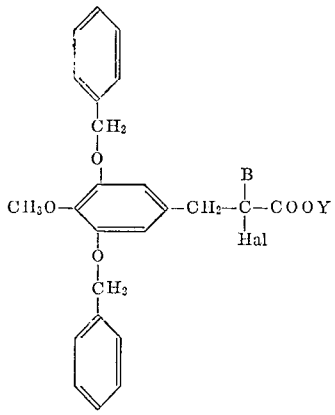 IIIc wherein Y is an alkyl, B is an alkanoyl group, and Hal is bromine or chlorine, which is precipitated upon concentration of the solution, can be further processed without purification.

The halogen atom of the esters of Formula IIIc can be exchanged for the amino group by the action of ammonia or a reactive derivative of ammonia, for example, by reaction with phthalimide or hexamethylenetetramine. A preferred method consists of reacting of an ester of Formula IIIc, substituted with bromine, with potassium phthalimide in an inert solvent, e.g., ethanol, dimethylformamide or benzene, at a temperature between room temperature and the boiling temperature of the reaction mixture. The phthalimido group is preferably hydrolyzed by heating with hydrazine in an alkanol to the boiling point of the reaction mixture. There is thus obtained a compound of Formula IIc.

Compounds of the general formula

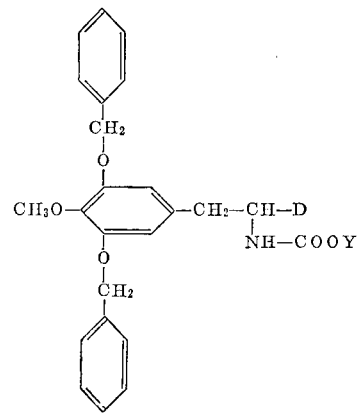 IId wherein Y is an alkyl and D is a carbalkoxy or a cyanogen group, can be prepared by reacting a halide or sulfonate of Formula IIIa with an alkali salt of a malonic ester or cyanoacetic ester in an inert solvent, e.g., an alkanol, benzene or dimethylformamide at elevated temperature, preferably at the boiling point of the reaction mixture, removing contaminants by extracting with water and isolating, by evaporation, the desired phenyl acetic acid derivatives substituted in the α-position by a carbalkoxy or cyanogen group and having the formula

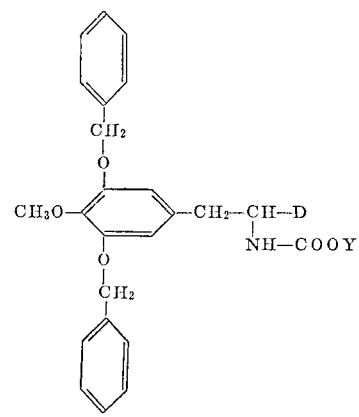 IIId wherein Y is an alkyl and D is a carbalkoxy or cyanogen group.

The compounds of Formula IIId can be converted to the corresponding acid hydrazides by the action of hydrazine. The acid hydrazides can then be converted into the corresponding acid azides by treatment with sodium nitrite. The resulting acid azides are converted into the corresponding isocyanates by heating in an inert solvent, and subsequently converted into the corresponding carbamic acid derivatives of Formula IId by the addition of alkanols.

Compounds of the general formula

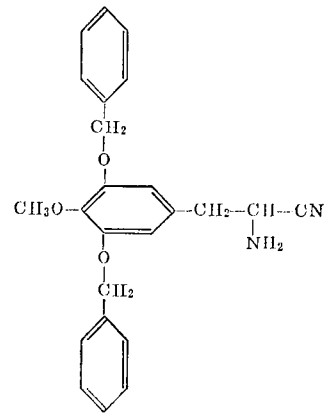 IIe and

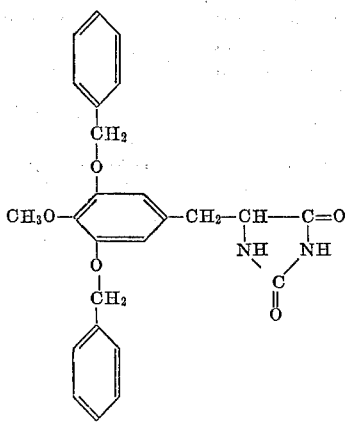

IIf can be prepared by reacting a halide or sulfonate of Formula IIIa with an alkali salt of a malonic ester or cyanoacetic ester in an inert solvent, e.g., an alkanol, benzene or dimethylformamide, at elevated temperature, preferably at the boiling point of the reaction mixture, and by converting the resulting α-cyano[or carbalkoxy]-β - (3,5 - dibenzyloxy - 4 - methoxyphenyl)-propionic acid ester, into the corresponding dihydrazide, with excess hydrazine and heat. The dihydrazide is transformed via the corresponding diazide with heat into the diisocyanate or dicarbamate in the presence of an alkanol. The resulting dicarbamate can be saponified by the action of a mineral acid, with heat, to 3,5-dibenzyloxy-4-methoxyphenyl acetaldehyde, which can be converted in the form of the bisulfite compound, into the α-hydroxynitrile of the formula

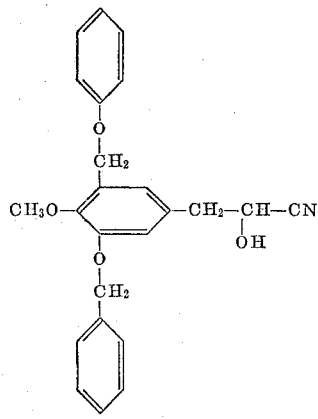

IIIe upon treatment with an alkali cyanide or hydrocyanic acid.

The compounds of Formula IIIe can be converted into the corresponding aminonitriles of Formula IIe by treating with ammonia, and into the corresponding hydantoins of Formula IIf by treating with ammonium carbonate. Both reactants, e.g., ammonia as well as ammonium carbonate are each advantageously employed in excess. Ammonia is advantageously employed in aqueous solution and ammonium carbonate in alcoholic solution. The formation of the nitrile and hydantoin can be accelerated by heating.

Compounds of the general formula

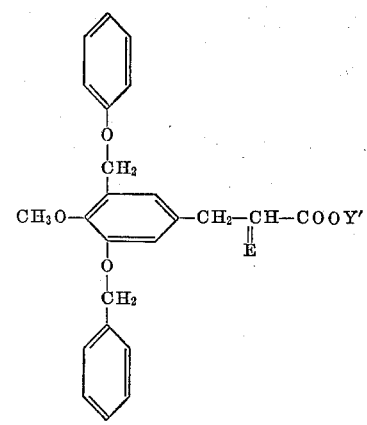

IIg in which Y' is hydrogen or an alkyl group and E is the hydroximino or phenylhydrazone group, can be prepared by reacting an ester of (3,5-dibenzyloxy-4-methoxybenzyl) malonic acid with an alkyl nitrite in the presence of an alkanol and a base, e.g., in the presence of an alkali alcoholate, at a temperature between room temperature and the boiling point of the reaction mixture. The oxime of the substituted phenylpyruvic acid ester of Formula IIg is thus formed with the loss of one carbalkoxy group.

When a phenyldiazonium salt, e.g., the phenyldiazonium chloride, is used instead of the above-mentioned alkyl nitrite, the corresponding phenylhydrazone derivative of Formula IIg is formed.

The oxime of Formula IIg can also be obtained by the condensation of 3,5 - dibenzyloxy - 4 - methoxybenzaldehyde with rhodanine, reacting the resulting 5 - (3,5-dibenzyloxy - 4 - methoxybenzylidene)rhodanine with dilute alkaline solution, and treating the resulting 1-thioxo - 2 - (3,5 - dibenzyloxy - 4 - methoxyphenyl)-propionic acid with hydroxylamine in an alcoholic-aqueous solution.

Obtained esters of the Formula IIg can be converted into the corresponding acids of Formula IIg by acid or alkaline hydrolysis.

Compounds of the formula

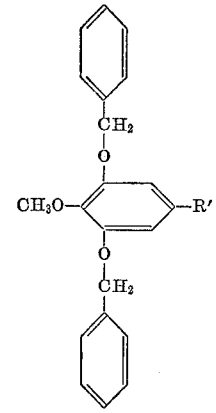

IIh-II wherein R' is one of the groups

 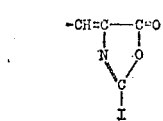 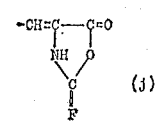

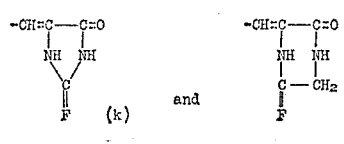 and 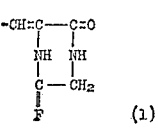

in which F is oxygen or sulfur and I is an alkyl, phenyl, phenylalkyl or alkylphenyl group, can be prepared by oxidizing 3,5 - dibenzyloxy - 4 - methoxybenzyl alcohol with manganese dioxide to the corresponding benzaldehyde, and reacting this product by heating with hydantoin or with 2-thiohydantoin in an alkanol thus splitting off water. The reaction may, if desired, be conducted in the presence of a catalyst, e.g., in the presence of sodium acetate or toluene sulfonic acid. The correspondingly substituted hydantoin or thiohydantoin of Formula IIk is thus formed.

When a compound of the formula

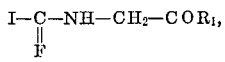

the oxazolidine - 2,5 - dione or -2-thione - 5 - one or the piperazine - 2,5 - dione or -2-thione-5-one is used in the above reaction instead of the hydantoin, a compound of Formula IIh, IIj or IIl respectively is formed. When the reaction between 3,5-dibenzyloxy - 4 - methoxybenzaldehyde and an acyl amino acid of the formula

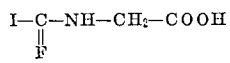

is carried out in the presence of acetic anhydride and sodium acetate with heating, a compound of Formula IIi is formed.

The compounds of the Formula IIb–IIf may be used as the racemates or the optically active compounds. The optical antipodes may be separated by conventional means, for example, basic compounds of Formula II may be separated with an optically active acid, e.g., tartaric acid and acid compounds of Formula II may be separated with an optically active base, e.g., quinine, brucine or tyrosine hydrazide. Thus, DL-3,5-dibenzyloxy-4-methoxyphenyl - N - acetylalanine can be separated into its optically active D- and L- forms by treating with tyrosine hydrazide.

The hydrogenation of the compounds of Formula II is advantageously performed between room temperature and about 80° C. at normal or elevated pressure. The hydrogenating agent can advantageously be catalytically activated hydrogen. The benzyl protective groups on the phenyl moiety of Formula II as well as the carbobenzoxy groups present in the Z position are removed by the use of palladium, Raney nickel or platinum as catalysts. The group E is simultaneously reduced to an amino group, and in the radicals (h)–(1) the double bonds between two carbon atoms are hydrogenated, and the azlactone residue (i) is cleaved forming the group

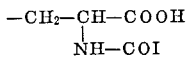

The benzyl protective groups as well as the carbobenzoxy groups at Z will be retained if hydrogen and Raney cobalt or a complex metal hydride, for example, sodium or lithium borohydride or sodium amalgam are used for the hydrogenation. These groups can subsequently be removed by the hydrogenation described above.

The invention includes, of course, also equivalent variants of the described processes and compounds, for example, such as where the benzyl group in the phenyl residue is substituted, for example, by a lower alkyl or a lower alkoxy group.

Compounds which result from the hydrogenation of compounds of Formula II and which are not converted to compounds of Formula I are represented by the following formula

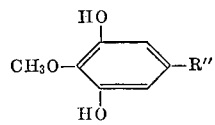

in which R″ is one of the groups

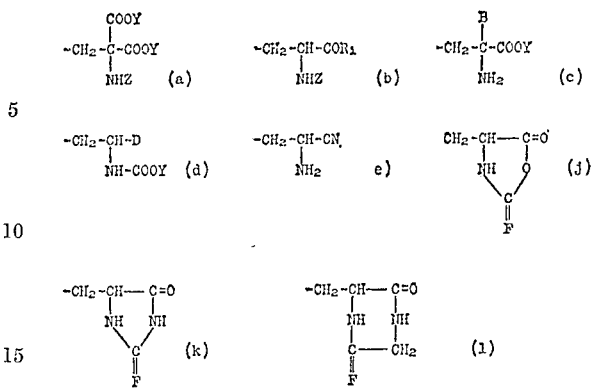

and Y, Z, $R_1$, B, D and F have the previously given meanings.

The compounds represented by Formula Vb, wherein Z is a hydrogen, are encompassed by Formula I and are thus the compounds of this invention. The remaining compounds of V must be hydrolyzed to convert them into the corresponding phenylalanine derivatives of the general Formula I. This hydrolysis is performed according to conventional means, e.g., the temperature is advantageously between room temperature and the boiling point of the reaction mixture, preferably at or near the boiling point. For example, compound of Formula Va is hydrolyzed to the corresponding amino acid with an acid, e.g., with aqueous sulfuric acid or hydrochloric acid in a concentration of approximately 2 N, hydrolytically cleaving and simultaneously decarboxylating one of the two carboxyl groups. The acyl radical Z, which is attached to the amino group, is also cleaved by the acid hydrolysis. When hydrochloric acid is used, the hydrochloride of the corresponding amino acid of Formula I, i.e., the hydrochloride of 3,5-dihydroxy-4-methoxyphenylalanine, is obtained.

Compounds of Formula Vb, wherein the Z is an acyl group, are advantageously hydrolyzed with acid to obtain 3,5-dihydroxy-4-methoxyphenylalanine.

Compounds of Formula Vc can be converted into 3,5-dihydroxy-4-methoxyphenylalanine by treating with strong alkali to simultaneously cleave the alkanoyl group B and the ester group Y.

Compounds of Formula Vd are advantageously hydrolyzed by acids. Thus, when D in Formula Vd is a cyanogen group, it is saponified by acid hydrolysis and simultaneously one of the two carboxyl groups present is removed to obtain 3,5-dihydroxy - 4 - methoxyphenylalanine.

The cyanogen group of the aminonitrile of Formula Ve is advantageously converted by acid hydrolysis into the carbamoyl group or, under vigorous conditions, into the carboxyl group.

The hydrolysis of the compounds of Formula Vj, Vk and Vl causes a cleavage of the heterocyclic rings to form the corresponding amino acid of Formula I, i.e., 3,5-dihydroxy-4-methoxyphenylalanine.

The 3,5 - dihydroxy-4-methoxyphenylalanine obtained after the hydrolysis, can be esterified with lower alkanols and, if desired, subsequently amidated with ammonia or with a primary or secondary amine. The esterification proceeds particularly smoothly in the presence of an acid catalyst, e.g., in the presence of hydrochloric acid, p-toluene sulfonic acid, sulfuryl chloride or thionyl chloride.

The free acids are amphoteric. The carboxyl group can, by reaction with bases, form the corresponding salts and the amino group, in contrast, is able to form acid addition salts by reaction with acids.

Racemates of the compounds of Formula I, obtained by the process according to the invention, can be resolved by conventional means. For example, esters can be separated with an optically active acid, e.g., tartaric acid and salts can be resolved with an optically active base, e.g., quinine or brucine.

The products of this invention are generally obtained in sufficiently pure form, so that further purification is not necessary. If inorganic contaminants are present, they can be removed with the aid of weakly basic and weakly acid ion exchanges.

The compounds of this invention are prepared in accordance with the following illustrative examples in which temperatures are in °C.

EXAMPLE 1

3,5-dibenzyloxy-4-methoxy-benzyl chloride (a) The starting material, 3,5-dibenzyloxy-4-methoxy-benzyl chloride, can be made by reducing 3,5-dibenzyloxy-4-methoxy-benzoic acid methyl ester with lithium aluminum hydride in tetrahydrofuran to 3,5-dibenzyloxy-4-methoxy-benzyl alcohol [M.P. 98–100° C.] and chlorinating this product with thionyl chloride in benzene. After recrystallization from heptane, the resulting 3,5-dibenzyloxy-4-methoxy-benzyl chloride melts at 76–78° C.

3,5-dibenzyloxy-4-methoxy-benzyl-acetylamino-malonic acid diethyl ester (b) A solution of 55 g. of acetaminomalonic acid diethyl ester in 280 ml. of dimethylformamide is added dropwise under vigorous stirring to a suspension of 12.1 g. of sodium hydride in 280 ml. of dimethylformamide. To the clear solution which forms, with evolution of hydrogen, there is added dropwise with further stirring a solution of 93 g. of 3,5-dibenzyloxy-4-methoxy-benzyl chloride in 20 ml. of dimethylformamide. The reaction mixture is heated on a steam-bath, with stirring for 3 to 5 hours. The neutral-reacting mixture is acidified with a few drops of alcoholic hydrochloric acid. The dimethylformamide is evaporated off under reduced pressure. The residue is partitioned between methylene chloride and water. The methylene chloride phase is washed two to three times with water, dried over calcium chloride and concentrated to a small volume under reduced pressure. The concentrate is diluted with ca. 500 ml. of ether. The crystalline 3,5-dibenzyloxy - 4 - methoxy-benzyl-acetylamino-malonic acid diethyl ester which precipitates upon cooling melts at 104–106°.

DL-3,5-dibenzyloxy-4-methoxy-phenyl-N-acetyl-alanine (c) 19 g. of 3,5-dibenzyloxy-4-methoxy-benzyl-acetylamino-malonic acid diethyl ester are treated with a solution of 3.5 g. of sodium hydroxide in 100 ml. of water and heated under reflux conditions for 6 to 7 hours. The slightly turbid solution is adjusted to a pH of ca. 3 while warm by addition of concentrated hydrochloric acid. After cessation of the evolution of carbon dioxide, the mixture is again heated to boiling for 30 minutes and adjusted to pH 1 with hydrochloric acid. The crystalline DL-3,5-dibenzyloxy - 4 - methoxy-phenyl-N-acetyl-alanine which precipitates upon cooling melts at 146–147° C.

DL-3,5-dihydroxy-4-methoxy-phenylalanine (d) 50 g. of DL-3,5 - dibenzyloxy-4-methoxy-phenyl-N-acetylalanine are suspended in 300 ml. of ethyl alcohol and hydrogenated with palladium-carbon. The compound thereby goes into solution and takes up ca. 6 liters of hydrogen. After completion of the uptake of hydrogen, the solution is filtered and evaporated under reduced pressure. The residue is treated with 500 ml. of 2 N hydrochloric acid and heated under reflux conditions for 4 to 5 hours. The reaction mixture is subsequently evaporated under reduced pressure, diluted with water and again evaporated. The evaporation with water is repeated two to three times. The concentrate is then dissolved in 200 ml. of water, filtered clear while hot with the help of decolorizing carbon and adjusted to pH 5.5 to 6.6 by addition of diethylamine. When air-dried, the crystalline DL-3,5-dihydroxy-4-methoxy-phenylalanine which precipitates upon cooling contains exactly 1.5 mol of water of crystallization and melts at 272–275° C. The water of crystallization can be removed by drying at 100° C. in high vacuum. When free of water of crystallization, the compound is strongly hygroscopic.

EXAMPLE 2

Resolution of DL-3,5-dibenzyloxy-4-methoxyphenyl-N-acetyl-alanine 11.2 g. DL-3,5-dibenzyloxy-4-methoxy-phenyl-N-acetyl-alanine and 4.2 g. (+)ephedrine are dissolved in 100 ml. of boiling acetone. The precipitated ephedrine salt obtained after allowing the solution to stand for two days at room temperature is isolated and washed successively with a little acetone and a large amount of ether. The salt, which melted at 140–144° C.; $\alpha_D = +45°$ (methanol; c.=1), is thereafter dispersed by agitation in N hydrochloric acid and ethyl acetate. The clear ethyl acetate layer is separated, washed twice with water, dried over sodium sulphate and evaporated under reduced pressure. The residual oily L-3,5-dibenzyloxy-4-methoxyphenyl-N-acetyl-alanine crystallizes on addition of a little ether and scratching to give crystals of melting point 115–116° C.; $\alpha_D = +24°$ (methanol; c.=1). The product is debenzylated by treatment with hydrogen in the presence of a palladium/carbon catalyst. After removal of the catalyst by filtration, the filtrate thus obtained is evaporated under reduced pressure. The residual L-3,5-dihydroxy-4-methoxy-phenyl-N-acetyl-alanine is taken up with 2 N hydrochloric acid and heated under boiling for 3 to 4 hours. The resulting solution is evaporated under reduced pressure and the residue dissolved in ethanol. The pH of the solution is adjusted to approximately 5.5–6 by the addition of diethylamine to precipitate L-3,5-dihydroxy - 4 - methoxyphenyl-alanine, M.P. 270–275° C.; $\alpha_D = -10°$ (N hydrochloric acid; c.=1).

EXAMPLE 3

3,5-dihydroxy-4-methoxy-acetamino-malonic acid-diethyl ester (a) 20 grams of 3,5-dibenzyloxy-4-methoxy-benzyl-acetamino-malonic acid-diethyl ester is suspended in 300 ml. of absolute ethanol and hydrogenated with palladium-carbon (5%). Upon taking up of about 1.9 liters of hydrogen, the compound goes into solution. The solution is filtered from the catalyst and the filtrate is concentrated to a syrupy thickness under reduced pressure. Upon the digestion with ether, crystallization occurs. The reaction mixture is filtered with suction and washed with ether. There is thus obtained 3,5-dihydroxy-4-methoxy-acetamino-malonic acid-diethyl ester which melts at 190–191°.

DL-3,5-dihydroxy-4-methoxy-phenylalanine (b) 15 grams of 3,5-dihydroxy-4-methoxy-benzyl-acetamino-malonic acid-diethyl ester is heated at reflux with 150 ml. of 2 normal hydrochloric acid for 6 to 7 hours whereby a clear, light brown colored solution is obtained. The solution is concentrated under reduced pressure and washed with water 2–3 times. The resinous residue is water soluble. It is filtered clear upon the addition of activated carbon and the almost colorless solution is brought to a pH of 6–6.5 by the addition of diethylamine. The thus obtained DL-3,5 - dihydroxy - 4-methoxy-phenylalanine is identical with the compound obtained according to Example 1.

EXAMPLE 4

Resolution of DL-3,5-dihydroxy-4-methoxyphenyl-alanine

The DL–3,5 - dihydroxy - 4 - methoxyphenyl-alanine obtained according to Example 3 is N-acylated by reaction with a acylating agent, e.g., acetic anhydride or an acetyl halide, in the presence of a weak base, e.g., potassium carbonate or sodium carbonate. The DL–3,5-dihydroxy-4- methoxyphenyl-N-acetyl-alanine obtained in this way is dissolved in ethanol and displaced with an equivalent amount of brucine. The solution is allowed to stand for 2 to 3 days at room temperature and the brucine salt which crystallizes out is isolated and thereafter decomposed using a cold saturated barium hydroxide solution. The liberated brucine is extracted with chloroform. The extracted aqueous phase is treated with the required amount of sulfuric acid for reaction with all the barium present and the resultant precipitate of barium sulfate is filter off. The mother liquor is evaporated under reduced pressure and the residual L–3,5-dihydroxy-4-methoxy-phenyl-alanine is purified by dissolving in a little water and reprecipitating with three to four volumes of ethanol. The product melts at 270–275° C.; $\alpha_D = -10°$ (N hydrochloric acid; c.=1).

EXAMPLE 5

5-(3,5-dibenzyloxy-4-methoxy-benzylidene) rhodanine (a) A mixture of 35 grams of 3,5-dibenzyloxy-4-methoxy-benzaldehyde, 14 grams of rhodanine, 500 ml. ethanol, and 20 ml. of concentrated ammonia is heated to boiling. 2 grams of ammonium chloride is added to the reaction mixture. The reaction mixture is then heated for an additional 3 hours. The whole is then cooled in ice water, filtered and washed with ethanol and ether. 5-(3,5-dibenzyloxy-4-methoxy-benzylidene) rhodanine is thus obtained as bright yellow crystalline needles which melt at 196–198°.

1-thioxo-2-(3,5-dibenzyloxy-4-methoxy-phenyl)-propionic acid (b) 35 grams of 5-(3,5-dibenzyloxy-4-methoxy-benzylidene) rhodanine is dissolved in a solution of 40 grams sodium hydroxide and 400 ml. of water by heating on a steam bath. After being allowed to cool to room temperature, the resulting reaction mixture is extracted twice with 300 ml. of ethyl acetate. The brown-green ethyl acetate solution is then mixed with 300 ml. of normal hydrochloric acid changing its color thereby into bright yellow. The ethyl acetate solution is then washed two or three times with water, dried over sodium sulfate and concentrated under reduced pressure. It remains a viscous yellow crystalline mass which is purified through recrystallization from methanol. The thus obtained 1-thioxo-2-(3,5-dibenzyloxy-4-methoxy-phenyl)propionic acid is in the form of light yellow crystals which melt at 164–165°. The compound is unstable and decomposes with the evolution of hydrogen sulfide, especially in the presence of mineral acids.

α-Hydroximino-β-(3,5-dibenzyloxy-4-methoxy-phenyl) propionic acid (c) 17 grams of 1-thioxo-2-(3,5-dibenzyloxy-4-methoxy-phenyl)propionic acid is suspended in 300 ml. of methanol and mixed with a concentrated solution of hydroxylamine base (prepared through the neutralization against phenolphthalein, of 8.5 grams of hydroxylamine hydrochloride with calcium hydroxide in a small amount of water in about 40 ml. of water. The reaction begins with the evolution of hydrogen sulfed at room temperature and terminates after 4 to 5 hours on a steam bath. It is then acidified with hydrochloric acid under reduced pressure and extracted with ethyl acetate after dilution with water. The ethyl acetate solution is washed two or three times with water, dried over sodium sulfate, and concentrated under reduced pressure. The residual oil which solidifies after a short time is purified by recrystallization from toluene. There is thus obtained α-hydroximino-β-(3,5-dibenzlyoxy-4-methoxy-phenyl)propionic acid melting at 162–163°.

DL-3,5-dihydroxy-4-methoxy-phenylalanine (d) 3.9 grams of α-hydroximino-β-(3,5-dibenzyloxy-4-methoxy-phenyl)propionic acid is dissolved in 60 ml. of methanol and hydrogenated in the presence of palladium-carbon. The compound, after about 24 hours absorbed 830 ml. of hydrogen. After completion of the taking up of hydrogen, the solution is filtered and concentrated to dryness under reduced pressure. The residual brownish foam is then dissolved in 15 ml. of water, and let stand in the cold for 2–3 days, whereupon, the resulting precipitated crystals are filtered and washed with small amounts of water, ethanol and ether. The thus obtained DL-3,5-dihydroxy-4-methoxy-phenylalanine is identical to the compound obtained according to Example 1.

EXAMPLE 6

DL-3,5-dibenzyloxy-4-methoxy-phenylalanine (a) 50 grams of DL-3,5-dibenzyloxy-4-methoxy-phenyl-N-acetyl-alanine and a solution of 100 grams of sodium hydroxide in 500 ml. of water are heated under reflux conditions for about 72 hours. Upon cooling of the reaction mixture, an oily sodium salt precipitates. After becoming cooled to 0°, the oily sodium salt is dissolved in ethyl acetate. The ethyl acetate solution is mixed with agitation with 10% acetic acid. The aqueous layer is then drawn off and the ethyl acetate solution kept overnight at room temperature. The resulting crystalline mass is then filtered and washed with ether. The crystalline mass is then purified by suspending it in hot absolute ethanol. It is then brought into solution by the addition of a few milliliters of ethanolic hydrochloric acid, filtered clear and neutralized with diethylamine. The crystallization is completed by allowing the reaction mixture to stand in the cold. The crystals thus obtained are filtered out and washed with ethanol and ether, they are white crystals of DL-3,5-dibenzyloxy-4-methoxy-phenylalanine melting at 212–225°.

DL-3,5-dibenzyloxy-4-methoxy-phenylalanine can also be derived from α - hydroximino - β-(3,5-dibenzyloxy-4-methoxy-phenyl)propionic acid through reduction with sodiumamalgam in aqueous ethanol at acidic pH's.

DL-3,5-dibenzyloxy-4-methoxy-phenyl-N-carbobenzoxy-alanine (b) 20 grams of DL-3,5-dibenzyloxy-4-methoxy-phenyl-alanine is mixed together with 4 grams of sodium hydroxide in 300 ml. of water and treated dropwise with 10 grams of carbobenzoxy chloride. The pH of the reaction mixture is brought to about 10 to 10.5 through the addition of a solution of caustic soda. The mixture becomes acidified toward the end of the reaction and is then shaken up with methylene chloride. The methylene chloride solution is washed with weakly acidified water 4 or 5 times, dried over sodium sulfate and concentrated under reduced pressure. The remaining resin is dissolved in 100 ml. chloroform and mixed with petroleum ether until it begins to become turbid. After standing in the cold for 12 hours, the formed crystals are filtered and washed with petroleum ether. The so-obtained white crystals of DL-3,5-dibenzyloxy - 4 - methoxy-phenyl-N-carbobenzoxy-alanine melt at 72–73°.

DL-3,5-dibenzyloxy-4-methoxy-phenyl-N-carbobenzoxy-alanine amide (c) 21 grams of DL-3,5-dibenzyloxy-4-methoxy-phenyl-N-carbobenzoxy-alanine is mixed together with 6 grams of N-hydroxysuccinimide in 200 ml. of methylene chloride and treated with 10.5 grams of N,N'-dicyclohexylcarbodiimide. After two or three hours, the reaction mixture is filtered and the filtrate concentrated. The resulting residue, a non-crystallizable oil is dissolved in 100 ml. of tetrahydrofuran, filtered and mixed with 10 ml. of concentrated ammonia. The reaction is completed in a few minutes. The whole is then evaporated under reduced pressure and the residue triturated with water, filtered and dried at 50° under reduced pressure. After the recrystallization from toluene DL - 3,5-dibenzyloxy-4-methoxy-phenyl-N-carbobenzoxy-alanine amide is obtained as white crystals which melt at 102–103°.

DL-3,5-dihydroxy-4-methoxy-phenylalanine amide hydrochloride (d) 16.5 grams of DL-3,5-dibenzyloxy-4-methoxy-phenyl-N-carbobenzoxy-alanine amide is suspended in 150 ml. of methanol and hydrogenated in the presence of palladium-carbon. After 1,930 ml. of hydrogen are absorbed in about 16 hours, compound produced thereby dissolves. After the absorption of hydrogen ceases, the solution is filtered and its pH brought to 5.0 to 5.5 by the addition of ethanolic hydrochloric acid. The solution is concentrated under reduced pressure to a small volume, after which the residual methanol is removed by repeated additions of isopropanol and further concentration. Following dilution with about 200 ml. of isopropanol and the addition of 30 to 40 ml. of ethyl acetate, crystallization begins. After standing 12 hours in the cold, the resulting precipitated crystals are filtered and washed with ethyl acetate and ether. The thus obtained DL-3,5-dihydroxy-4-methoxy-phenylalanine amide hydrochloride is slightly soluble in water and melts at 190–192° C. with decomposition.

EXAMPLE 7

Resolution of DL-3,5-dihydroxy-4-methoxyphenyl-alanine amide hydrochloride 13.1 g. DL - 3,5 - dihydroxy-4-methoxyphenyl-alanine amide hydrochloride is dissolved in 200 ml. of water and displaced while stirring vigorously by 12.6 g. of silver mono-tartrate. The accumulated silver chloride is filtered off after fifteen minutes and the mother liquor is strongly concentrated under reduced pressure and diluted with two or three times the amount of absolute ethanol. The crystals of tartrate salt which have accumulated after two to three days are isolated, washed with a little ethanol and finally decomposed by the addition of 2 N hydrochloric acid. The liberated tartaric acid is removed by means of repeated extraction with ether. The aqueous phase is heated under reflux conditions for three to four hours and thereafter evaporated under reduced pressure. The residue is dried by repeatedly dissolving in absolute ethanol and evaporating, and then taken up in absolute ethanol. Separated out ammonium chloride is filtered off and the pH of the solution is adjusted to about 5.5–6 by the addition of diethylamine. The precipitated L - 3,5 - dihydroxy-4-methoxy-phenyl-alanine melts at 270–275° C.; $\alpha_D = -10°$ (N hydrochloric acid; c.=1).

EXAMPLE 8

2-phenyl-4-(3,5-dibenzyloxy-4-methoxy-benzylidene) oxazole-5-one (a) A mixture of 70 grams of 3,5-dibenzyloxy-4-methoxy-benzaldehyde, 18 grams hippuric acid, 20 grams of anhydrous sodium acetate and 500 ml. of acetic anhydride are heated on a steam bath. The reaction mixture at first becomes orange colored and gradually goes into the solution. After 1 to 1½ hours on a steam bath, the reaction mixture solidifies to a crystalline mass. It is then digested while cooling with ether, filtered and washed out with ether and much water. The remaining 2-phenyl-4-(3,5-dibenzyloxy-4-methoxy-benzylidene)oxazole-5-one crystallized as bright yellow needles melting at 159–160°.

DL-3,5-dibenzyloxy-4-methoxy-phenyl-N-benzoyl alanine (b) 11 grams of 2-phenyl - 4 - (3,5-dibenzyloxy-4-methoxybenzylidene)-oxazole-5-one is heated on a steambath in 200 ml. of 80% ethanol and treated portionwise with about 150 grams of 5% sodiumamalgam. The reaction ends after about 2 hours. There results thereby a clear almost colorless solution which is decanted from mercury while still lukewarm, washed with ethanol and filtered. The filtrate is then concentrated under reduced pressure to about 50–60 ml., diluted with about 400 ml. of distilled water and made congo acid with concentrated hydrochloric acid. A precipitate forms which is filtered after standing about 12 hours, washed with water and dried under reduced pressure at about 50–60° C.

DL-3,5-dihydroxy-4-methoxy-phenylalanine (c) 11 grams of DL-3,5-dibenzyloxy-4-methoxy-phenyl-N-benzoyl alanine is suspended in 200 ml. of methanol and hydrogenated with 5% palladium-carbon. The theoretical amount of hydrogen is taken up after about 2 hours. The reaction mixture is filtered from the catalyst and evaporated under reduced pressure. The resinous residue is heated for about 1 to 1½ hours with 2 N hydrochloric acid under reflux conditions whereby the resin dissolves. The benzoic acid which becomes precipitated is removed after cooling by mixing with ether. The aqueous solution is evaporated to dryness under reduced pressure and redissolved in a little water. Diethylamine is added to bring the pH of the solution to from 6 to 6.5. DL-3,5-dihydroxy-4-methoxy-phenylalanine then precipitates, This compound is identical to that produced according to Example 1.

EXAMPLE 9

Manufacture of tablets of the following composition:

|  | G. |
|---|---|
| DL-3,5-dihydroxy-4-methoxy-phenylalanine | 100 |
| Lactose | 61 |
| Maize starch | 30 |
| Polyvinylpyrrolidone | 4 |
| Talcum | 5 |
|  | 200 |

The active substance is mixed with the lactose and the maize starch and, after addition of a solution of the polyvinylpyrrolidone in 40 ml. of ethyl alcohol. granulated. The granulate is dried at 30°, mixed with the talcum and pressed to tablets.

|  | Mg. |
|---|---|
| Individual weight of one tablet | 200 |
| Active substance content of one tablet | 100 |

EXAMPLE 10

Manufacture of gelatin capsules of the following composition:

|  | Grams |
|---|---|
| DL-3,4-dihydroxy-4-methoxy-phenylalanine | 200 |
| Mannitol | 395 |
| Stearic acid | 5 |
| Total | 600 |

The ingredients are homogenously mixed and filled into interlocking capsules via a capsule filling machine.

|  | Mg. |
|---|---|
| Individual weight of one capsule | 600 |
| Active substance content of one capsule | 200 |

EXAMPLE 11

Manufacture of gelatin capsules of the following composition:

|  | Grams |
|---|---|
| DL-3,5-dihydroxy-4-methoxy-phenylalanine | 500 |
| Stearic acid | 5 |
| Total | 505 |

The ingredients are homogenously mixed and filled into interlocking capsules via a capsule filling machine.

|  | Mg. |
|---|---|
| Individual weight of one capsule | 505 |
| Active substance content of one capsule | 500 |

EXAMPLE 12

To illustrate the therapeutic activity of the compounds of this invention as hypotensives, normal adult rats are operated according to A. Grollman, Proc. Soc. exp. Biol.

(N.Y.) 57 102–104 (1944) and implanted with desoxycorticosterone acetate. The animals are thereafter fed 0.9% sodium chloride solution an lib. This treatment created a hypertension in the rats. The so-treated hypertensive rats are each given a peroral dose of gum arabic solutions containing 100 mg./kg. of 3,5-dihydroxy-4-methoxyphenylalanine (A) twice daily for 2½ days and the hypotensive response measured by the change of blood pressure was obtained at intervals according to the following table:

| Time | Administration of 100 mg./kg. of A | Change of blood pressure, mm. Hg |
|---|---|---|
| 1st day: | | |
| 10 a.m. | Yes | |
| 11 a.m. | | −25 |
| 1 p.m. | | |
| 3 p.m. | Yes | |
| 2d day: | | |
| 9 a.m. | | −17 |
| 10 a.m. | Yes | |
| 1 p.m. | | −26 |
| 3 p.m. | Yes | |
| 3rd day: | | |
| 9 a.m. | | −19 |
| 10 a.m. | Yes | |
| 1 p.m. | | −32 |
| 3 p.m. | | |
| 4th day: | | |
| 9 a.m. | | −18 |

It is evident that the hypotensive response of compound A when administered in daily oral doses of 2× 100 mg./kg. is substantial and long lasting (note that hypotensive effect was still present on the 4th day 23 hours after the last application).

EXAMPLE 13

This example serves to illustrate the comparative absence of sedative side effects associated with the use of 3,5-dihydroxy 4-methoxyphenylalanine (A) when compared with α-methyl-dopa (B). The test utilized in this example is a rotating rod test which serves to screen chemical compounds for effects on muscle tone and/or muscular coordination whereby being indicative of sedative properties. The method employed is a modification of that described by M. W. Dunkan and T. S. Miya: J. A. Ph. A. Sci. Ed. 46, 208 (1957). (CR–1 mice selected on the basis of their ability of remaining for two minutes on a rod 30 millimeters in diameter) rotating at 16 revolutions per minute are used. Groups of eight mice per dose level are placed on the rotating rods 30 minutes after drug administration and observed for two minutes. Those which fail to remain on the rod for the full two minutes are considered to be affected by the drug. The results of this test are summarized in the following table:

INHIBITION OF MUSCLE TONE AND/OR COORDINATION IN MICE, MEASURED ON THE ROTATING ROD

| Compound | Dose, mg./kg. p.o. | Reduction in hold time | In percent [1] after (min.) | Duration of effect (hours) | $HD_{50}$,[2] mg./kg. (p.o.) |
|---|---|---|---|---|---|
| A | 300 | 13 | 30 | | >300 |
|  | 100 | 29 | | | |
|  | 30 | 11 | | | |
| B | 300 | 60 | 180 | >4 | 180 |
|  | 100 | 38 | | | |
|  | 30 | 0 | | | |

[1] The holding time was measured repeatedly during 4 hours. The time given here represents the point in time where the strongest reduction was observed.
[2] $HD_{50}$ is that dose after which 50% of the mice can stay on the slowly rotating rod for less than 2 minutes.

The above table shows that 3,5-dihydroxy-4-methoxyphenylalanine substantially influence the position and holding reflexes of the mouse thereby showing absence of sedative properties. In contrast to this, α-methyl-dopa showed substantial sedative side effects.

We claim:
1. A compound of the formula

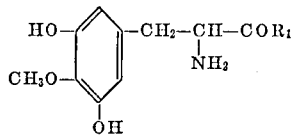

wherein $R_1$ is hydroxyl, lower alkoxy, amino or substituted amino selected from the group consisting of mono lower alkyl amino, di-lower alkylamino, mono hydroxy alkylamino, dihydroxy lower alkylamino and cyclo lower alkylamino selected from the group consisting of piperidino and morpholino; optical isomers and pharmaceutically acceptable salts thereof.

2. DL-3,5-dihydroxy-4-methoxy-phenylalanine.
3. DL-3,5-dihydroxy-4-methoxy-phenylalanine amide.
4. DL-3,5-dihydroxy-4 - methoxy - phenylalanine ethyl ester.
5. L-3,5-dihydroxy-4-methoxy-phenylalanine.
6. L-antipodes of a compound of the formula

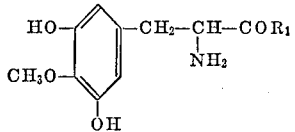

wherein $R_1$ is hydroxyl, lower alkoxy, amino or substituted amino selected from the group consisting of mono lower alkylamino, di-lower alkylamino, mono hydroxy lower alkylamino, dihydroxy lower alkylamino and cyclo lower alkylamino selected from the group consisting of piperidino and morpholino; optical isomers and pharmaceutically acceptable salts thereof.

References Cited

UNITED STATES PATENTS 2,868,818  1/1959  Pfister et al. _____ 260—559 A X
3,329,711  7/1967  Hegedus et al. _____ 260—519
3,344,023  9/1967  Reinhold et al. _____ 260—519 X

OTHER REFERENCES

Bolhofer, J. Am. Chem. Soc. vol. 76, pp. 1322 to 1326 (1954).
Patel et al., Drug Research, vol. 9, pp. 232 to 233 and 235, Birkhauser Verlag Basel und Stuttgart (June 1966).
Smith, J. Chem. Soc. 1958, pp. 3740 to 3741.
Fennoy, J. Org. Chem. vol. 26, pp. 4696–4697 and 4700 to 4701 (1961).

JOHN D. RANDOLPH, Primary Examiner

U.S. Cl. X.R.

260—240 F, 247.5 R, 260, 294.7 E, 309.5, 465, 562; 424—248, 267, 319, 370